US005223698A

United States Patent [19]

Kapur

[11] Patent Number: 5,223,698

[45] Date of Patent: Jun. 29, 1993

[54] CARD-ACTIVATED POINT-OF-SALE LOTTERY TERMINAL

[75] Inventor: Shashi B. Kapur, Tampa, Fla.

[73] Assignee: Telecredit, Inc., Los Angeles, Calif.

[21] Appl. No.: 681,017

[22] Filed: Apr. 5, 1991

[51] Int. Cl.[5] .............................................. G06F 15/28

[52] U.S. Cl. .................................... 235/375; 364/412

[58] Field of Search ................ 235/375, 380; 364/409, 364/412

[56] References Cited

U.S. PATENT DOCUMENTS

| | | | |
|---|---|---|---|
| 4,764,666 | 8/1988 | Bergeron | 235/375 |
| 4,833,307 | 5/1989 | Gonzalez-Justiz | 235/375 |
| 4,882,473 | 11/1989 | Bergeron et al. | 235/375 |
| 4,902,880 | 2/1990 | Garczynski et al. | 235/375 |

FOREIGN PATENT DOCUMENTS

| | | | |
|---|---|---|---|
| 2608813 | 6/1988 | France | 235/375 |

*Primary Examiner*—John Shepperd

*Attorney, Agent, or Firm*—Nilsson, Wurst & Green

[57] ABSTRACT

A lottery ticket sales system serves a multiplicity of facilities, each having a plurality of point-of-sale locations. Sales are expedited by cards customized for individual customers only with desired wager data in machine-readable form to identify repeated purchases. Terminals at point-of-sale locations in a facility are coupled to a facility play center for interfacing a remote central computer through telephone communications. Cards, void of individual data, are prepared by the play centers. Terminals receive cards for cooperation with a facility play center to formulate an order data pocket communicated to the central computer. Contemplated purchase data packets are supplied from the central computer for actuating source terminals to display a purchase value for approval or rejection. Approved purchases prompt the terminal to issue one or more lottery tickets with the recorded wager data.

3 Claims, 3 Drawing Sheets

CARD-ACTIVATED POINT-OF-SALE LOTTERY TERMINAL

BACKGROUND OF THE INVENTION

1. Field of the Invention

The invention relates to wagering systems and more specifically to systems for dispensing lottery tickets, for example, systems actuated by a customer's transaction card to expedite each transaction.

The public lottery has become widely accepted, based on its use to support government activities while providing aspects of entertainment and hope to the public. Conventional public lotteries have been facilitated by computers and data processing systems operating in various formats. For example, one conventional lottery system includes ticket-dispensing terminals coupled by leased telephone lines to a central computer. The terminals are placed in retail establishments at point-of-sale locations for operation by clerks to issue lottery tickets. Wagers are based on various criteria as random numbers or numbers selected by ticket purchasers.

It has been proposed to expedite the operation of lottery data processing systems by providing game cards to individual players or purchasers. That is, it has been proposed to provide potential players with game cards for use in data processing systems to facilitate the purchase of lottery tickets. Generally, in the development of such systems a primary objective has been to simplify procedures for obtaining and processing substantial personal information on individual players. For example, cards have been utilized to store identification data that is unique to an individual player. In general, the system of the present invention is based on recognizing the significance of depersonalizing the purchase of a lottery ticket.

The effective operation of a lottery system involves a capability to efficiently and rapidly issue lottery tickets at locations that are convenient to purchasers. For example, the individual point-of-sale lanes of a supermarket are convenient locations for the sale of lottery tickets. However, to be practical, selling tickets at such locations necessitates an operation that is simple and fast. In that regard, complications tend to arise. Specifically, transactions may be complex necessitating a substantial exchange of wagering data. Also, prior systems often have been concerned with identification data for a specific purchaser. Of course, the operation can be expedited by utilizing computer techniques; however, in general, the system of the present invention departs philosophically from prior conventions to accomplish rapid, efficient and simple operations to sell lottery tickets.

2. Prior-Art Considerations

As suggested, it has been proposed to expedite the transaction of purchasing a lottery ticket by issuing cards to lottery players. For example, systems based on the use of player cards are disclosed in U.S. Pat. Nos. 4,764,666 (Bergeron) and 4,882,473 (Bergeron et al.)

Generally, in accordance with the present invention, disadvantages are recognized with respect to documents (including cards) bearing personal identification information on a lottery participant. For example, a lottery card customized to a specific individual may be susceptible to misuse or may present a threat to an individual's privacy. For example, a person may wish to participate routinely in a lottery without the fact being known. In such instances, the existence of a lottery identification card poses a threat to the privacy of the card holder. Cards susceptible to misuse present a further problem. In accordance with the present invention, a system is implemented without the need for unique, personalized, identification documentation, yet which is capable of fast, simple and efficient operation to dispense lottery tickets.

SUMMARY OF THE INVENTION

In general, the present invention is directed to a lottery processing system including a plurality of terminals for location at point-of-sale stations, as in a supermarket or department store. The terminals are connected to a play center unit for interfacing a central control computer through telephone communications. The play center unit implements the operation of the terminals and functions independently to provide lottery ticket purchasers with cards bearing data, as to specify numbers for repeated wagers. Specifically, for example, a lottery ticket purchaser repeatedly may wish to purchase five lottery tickets wagering on numbers derived from family birthdays.

In the disclosed system, player cards bear a magnetic stripe recorded with wager data in a machine-readable form. Accordingly, passing a card through a terminal enters the wager data for the purchase of one or more lottery tickets. The terminal is driven to display the total cost of the transaction so that the attending sales clerk can conclude the payment arrangement. To conclude the transaction, the terminal is actuated to provide the ticket or tickets. As a part of that operation, the terminal interfaces the central control computer through the play center and telephone facilities to store the transaction and provide identification data for each of the lottery tickets issued. The data is communicated back to the terminal where it is imprinted on the lottery ticket that is then dispensed and delivered to the purchaser. Accordingly, the operation of the system is fast, convenient and efficient yet may be void of potentially problematic personal identification data.

BRIEF DESCRIPTION OF THE DRAWINGS

In the drawings, which constitute a part of this specification, exemplary embodiments exhibiting various objectives and features hereof are set forth. Specifically.

DESCRIPTION OF THE ILLUSTRATIVE EMBODIMENT

As required, a detailed illustrative embodiment of the present invention is disclosed herein. However, the physical communication system, data formats, verification methods and operating structures in accordance with the present invention may be embodied in a wide variety of different forms, some of which may be quite different from those of the disclosed embodiment. Consequently, the specific structural and functional details disclosed herein are merely representative, yet in that regard, they are deemed to afford the best embodiment for purposes of disclosure and to provide a basis for the claims herein which define the scope of the present invention.

Figure 1:
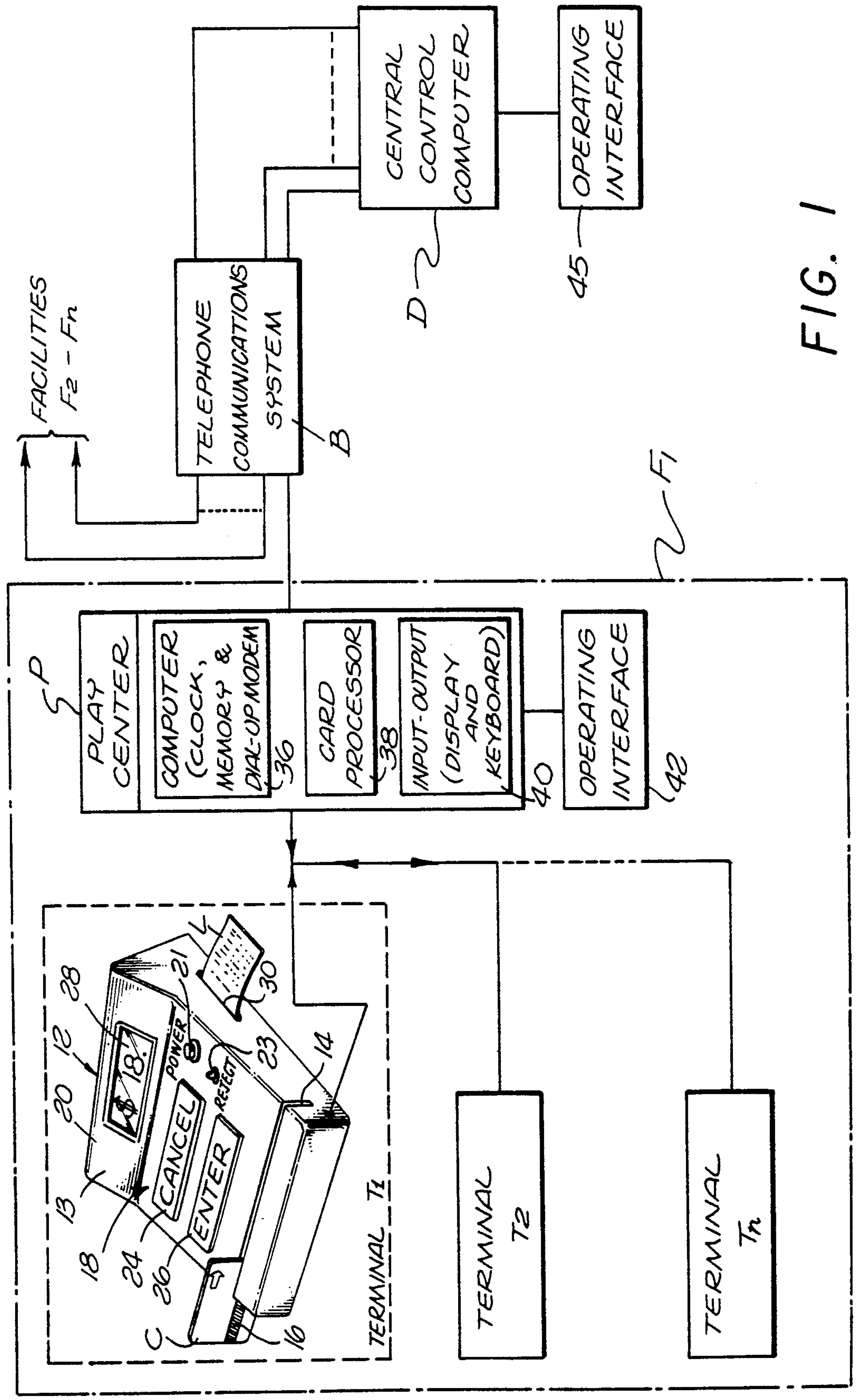
FIG. 1 is a block and perspective diagram of a system constructed in accordance with the present invention.
Figure 3:
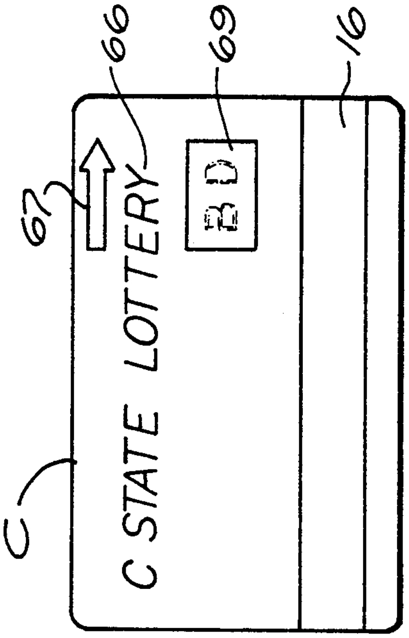
FIG. 3 is a plan view of a lottery card as utilized in the system of FIG. 1.

Referring initially to FIG. 1, one terminal T1 of several terminals T1–Tn is shown receiving a transaction card C (left side, also see FIG. 3) and dispensing a lottery ticket L (FIG. 1, right side). Generally, the terminals T1–Tn function cooperatively with a play center P to interface a central control computer D through a public telephone communication system B. Essentially, the terminals T1–Tn and the play center P comprise a facility installation F1, there being several other such installations F2–Fn. Typically, a facility installation serves a market, store or other facility.

To consider the operation of the system somewhat summarily, the transaction or order card C specifies wager data for the purchase of one or more lottery tickets L. If proper, the cost of a transaction is indicated by the terminal T1 and if approved, prompts the system to issue the ticket or tickets. Each ticket indicates: the wager number, the sales location (facility F1–Fn), date of sale and an identification number for the ticket. However, in the disclosed embodiment, the machine-readable data on the card C consists solely of wager data to specify wagers to be made repeatedly by a participant.

Considering the system in somewhat greater detail, as the terminals T1–Tn are similar, only the terminal T1 will be described in detail. Specifically, the terminal T1 is embodied in a housing 12 for location at a point-of-sale. For example, in a supermarket facility, a terminal, as the terminal T1, would be located at each checkout lane. Generally, the terminal would be positioned for convenient access to a sales clerk and clearly within view of a ticket purchaser.

The housing 12 is somewhat the shape of a flat box with an upper surface 13 being canted forward for operating components. At a forward location, the housing 12 defines an elongate transverse slot 14, penetrating the surface 13, for receiving a transaction card C as illustrated. Note that the card C carries a magnetic stripe 16 that is sensed by a transducer or card reader (not shown) positioned inside the housing 12 adjacent to the slot 14. Various forms of mechanisms for reading magnetic cards are well known as may be embodied in the terminal T1. For example, one form of card-reading apparatus is shown and described in U.S. Pat. No. 4,949,192.

The surface 13 is divided to define a forward control panel 18 and a display panel 20. Behind the slot 14, the control panel 18 is dominated by a pair of push bars 24 and 26, each comprising a manually operated contact switch. Specifically, the push bar 24 is designated "cancel" and the push bar 26 is designated "enter". Generally, after data for a transaction is sensed from the card C and processed, one or the other of the push bars 24 or 26 is depressed to either cancel or enter the transaction.

Positioned at the right of the push bars 24 and 26 is a "reject" lamp 23 for indicating an abortive situation. That is, when the card C cannot be read to produce proper data, or other discrepancies occur, the lamp 23 is illuminated. An on-off push-button switch 21 controls power to the terminal T1. A lock control may be integrated with the switch 21.

Located at the rear of the surface 13 in the display panel 20 is a window 28 incorporating a digital display apparatus for showing the value of a contemplated transaction. For example, as illustrated, the wager data sensed from the magnetic stripe 16 of the card C might be indicated by the window 28 as "$18".

At the right side of the terminal housing 12, as shown, an elongate passage 30 is provided through which lottery tickets L are dispensed. Generally, the housing 12 contains a printer for printing lottery tickets L as specified.

As indicated above, and described in greater detail below, each of the terminals T1–Tn is connected to the play center P. Typically, the play center unit is located in a common area to serve the terminals T1–Tn at individual point-of-sale locations. Functionally, the play center P interfaces the terminals T1–Tn with the telephone system B for cooperation with the central control computer D. Additionally, the play center P records raw order cards C in accordance with individual desires for a repetitive transaction.

As illustrated, the play center P incorporates a local computer 36, a card processor 38 and an input-output section 40. The computer 36 may comprise a form of PC and has both a clock and memory capacity indicating the facility location. The computer 36 also incorporates control capability for the card processor 38, the input-output unit 40 and an operating interface 42 of limited access. Finally, the computer 36 incorporates dial-up and modem capability for communication through the telephone system B.

The card processor 38 records blank or raw cards with machine-readable data. In the disclosed embodiment, the card processor 38 is a magnetic card recording apparatus driven by the computer 36 to accomplish a specific record on the magnetic stripe 16 of the card C. The data to be recorded on the card is provided through the computer 36 by the input-output unit 40. Various forms of card processors, input-output units and computers are well known in the prior art to function in accordance with the requirements of the computer 36, the processor 38 and the input-output unit 40. Generally, the input-output unit may incorporate an alphanumeric display and keyboard in the style of an automatic teller for cueing a user and confirming input data.

As suggested above, the operating interface 42 is for limited access and use by maintenance personnel as to program the play center P. For example, it may be desirable to modify the clock in the computer 36 or the identification assigned to the facility F1. Similarly, telephone numbers for communication through the telephone system B may be altered from time to time.

Communications from the facilities F1–Fn as provided through the telephone system B are processed and recorded by the central control computer D. In that regard, the computer D may take the form of a mainframe unit capable of accommodating substantial communications concurrently to process order requests and thereby formulate lottery-ticket order data both for communication back to individual terminals and to be recorded for possible future use. Note that for each lottery ticket sold, the computer D records in memory certain data addressable by the wager data. Specifically, coded data is stored to indicate the facility (F1–Fn), the date of a ticket sale and an assigned identification number. Also, in accordance with conventional systems, the control computer D incorporates an operating interface 45 for programming and control.

Figure 2:
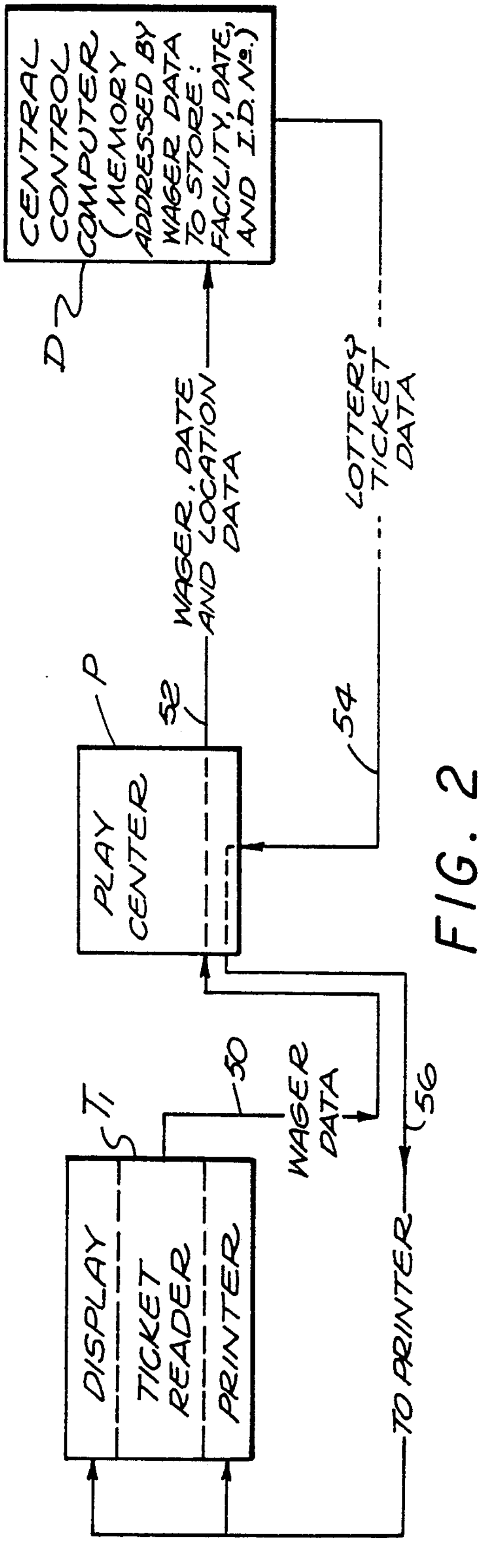
FIG. 2 is a schematic block diagram of a portion of the system of FIG. 1 illustrating data flow paths.

The communication patterns of the system of FIG. 1 are illustrated in FIG. 2 and will now be considered. In that regard, the terminal T1 is symbolically represented to exemplify the terminals along with the play center P and the central control computer D. In the operation of the system an order card C (FIG. 3) is placed in the terminal T1 to be sensed by a card reader (FIG. 2) for providing wager data to be carried as indicated by a line 50. The wager data comprising a series of numbers is supplied through the line 50 to the play center P for combination with location data and date data to formulate an order data packet that is supplied through the telephone system B (not shown in FIG. 2) to the central control computer D. The data path is presented by a line 52 in FIG. 2.

Upon receipt of a proper order data packet, the central control computer D records the significant data and formulates a lottery-ticket purchase data packet that is returned through the play center P in a data path indicated by the line 54. Specifically, the purchase data packet includes the lottery numbers or wager data that is confirmed, along with designations of the source facility, the date and a ticket identification number. As indicated, the purchase data is recorded by the memory of the computer D.

From the play center P, the lottery-ticket purchase data packet is provided to the terminal T1 to drive the ticket printer and thereby record the lottery ticket L. Of course, various formats may be employed; however, as indicated above, the lottery ticket L minimally will carry the wager numbers (wager data), data information, sales facility location information and identification information formulated by the central control computer D.

Figure 4:
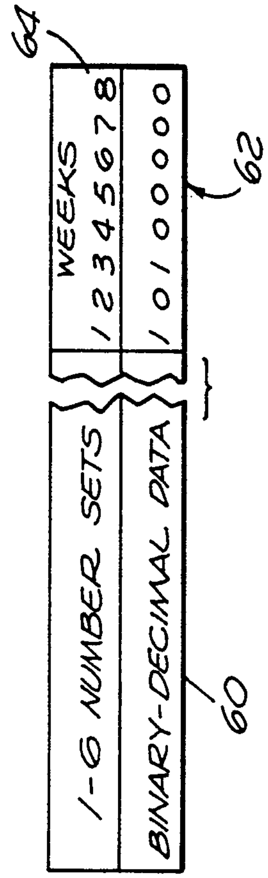
FIG. 4 is a diagrammatic representation illustrating the data format of the card of FIG. 3.

It is again noted that the lottery-ticket purchase data is void of personal identification of the ticket purchaser. Similarly, as indicated above, the order card C (FIG. 3) also is void of personal identification data. Rather, the magnetic stripe 16 merely carries wager data. Of course, any of a variety of recording formats may be employed to carry such data; however, an exemplary format is illustrated in FIG. 4.

Essentially, in addition to the well known synchronizing data, the magnetic stripe is divided into two fields, specifically a wager field 60 and a time field 62. The field 60 is recorded in a binary-decimal format and specifies from one to six number sets indicating the wagering numbers for specific tickets. Thus, the field 60 may accommodate the wagering data for up to six lottery tickets. Each of the six tickets specified by the field 60 may be issued for each of the eight weeks related to the time of the transaction. Specifically, for example, the field 62 may define eight weeks as indicated in the format section 64 to specify a purchase for the current week if a binary "one" is recorded in the defined position. As illustrated, the provision of binary "ones" in the position "one" and "three" specify purchases of lottery tickets for both the current and third weeks. Thus, the specified number of lottery tickets bearing the specified number of number sets (wager numbers) would be ordered for the current and third weeks.

Considering the card C further, it may simply take the form of a conventional plastic credit or debit card bearing printed indicia 66 indicative of the lottery and an insertion direction arrow 67. Also, a writing area 69 is provided for use by the card holder. For example, the holder of the card C may designate a card as by letters BD to indicate birthday wagers.

To complete raw forms or blanks of the card C, the play center P (FIG. 1) may be installed in the fashion of an automatic teller machine so that a customer uses the input-output unit 40 to control the computer 36 to control the card processor 38 to record and dispense a completed card. For such an installation, the customer is simply cued for appropriate wager information to record the card.

Alternatively, the play center P may be constructed and arranged for use by an attendant of the sales facility. In that event, a less secure installation is provided. In any event, the play center P simply receives information to record the card C (FIG. 3) in the format as illustrated in FIG. 4, specifying specific wager number sets for a predetermined number of tickets to be issued for the present or future lottery weeks. No personal information is recorded.

In view of the above description of the system, a comprehensive understanding of the structure and the operation may now best be accomplished by assuming certain conditions and explaining the operating events of a sequence to follow. Accordingly, assume the existence of a person contemplating a regular purchase of lottery tickets bearing the same wager numbers. For example, for one reason or another, a player may wish to purchase one ticket with the lottery number: "3 51 47 18 60 14" for the current week each time the lottery card is presented. Accordingly, the player is provided with an order card C (FIG. 2) at the play center P (FIG. 1) recorded to enter such data. As indicated above, additional numbers may be provided for additional tickets designated for additional weeks.

Assume now that the card holder wishes to use the card to consummate a lottery ticket purchase. As indicated above, the card holder may be located in the checkout lane at a supermarket with an attended point-of-sale station served by the terminal T1 (FIG. 1). For example, the terminal T1 may be positioned for convenient access to the point-of-sale sales clerk or attendant, where it may be conveniently viewed by the prospective purchaser. The purchaser likely will be making other purchases that will be totaled by a point-of-sale register. Indicating a desire to purchase lottery tickets, the purchaser simply passes his card to the attendant who moves the card through the slot 14 entering the wager data. As a consequence, the play center P is actuated to add location and date data for the formulation of a communication data packet which is transmitted through the system B to the central control computer D as indicated by the block 70 in FIG. 5. Upon receiving the data packet, the computer D tests the format as indicated by a query block 72 (FIG. 5) and if improper, indicates a rejection as illustrated by the block 74. Specifically, if the order data packet is not in an appropriate format, as indicating an improper lottery number, the control computer D transmits a rejection signal back to the terminal T1 through the telephone system S and the play center P. As a consequence, the reject lamp 23 is illuminated on the panel of the terminal T1 manifesting the impropriety. Typically, another attempt would be made with the card C, however failing that, a fresh card normally would be provided.

Figure 5:
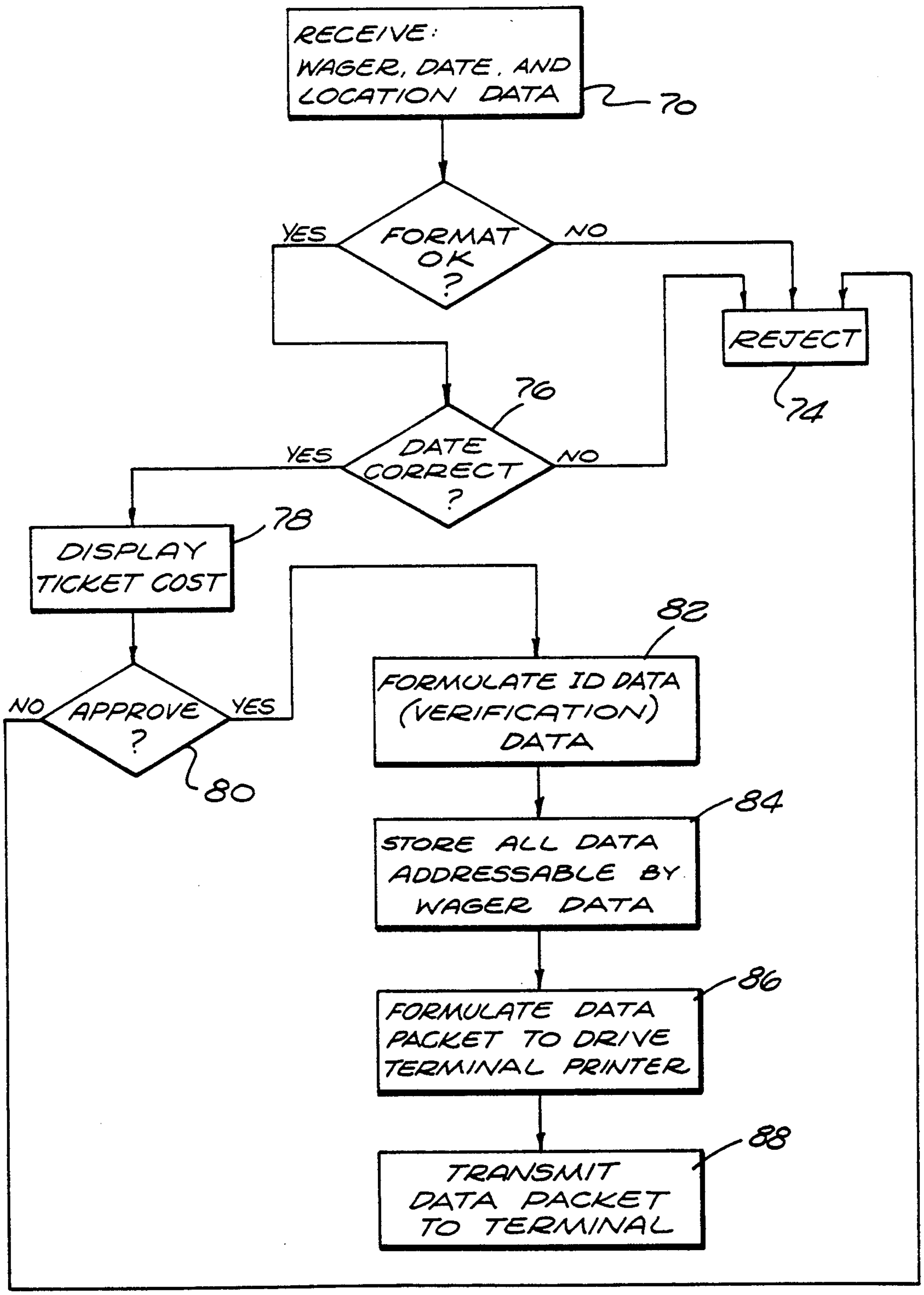
FIG. 5 is a flow diagram of an operating format of the system of FIG. 1.

If the format of a data packet is determined to be appropriate by the computer D, the system proceeds to verify the indicated date as illustrated by a query block 76 in FIG. 5. Again, an improper date will prompt a rejection as described above. However, confirmation of the correct date advances the process to a computation for determining the cost of the lottery tickets as specified. Specifically, as illustrated by the block 78 in FIG.

5, the cost is determined by the computer D and a representative signal is provided from the computer D through the telephone system B and the play center P to activate the display 28. As illustrated, the display shows a proposed purchase in the amount of "$18".

With the amount of the purchase displayed, the purchaser either approves or declines the purchase. If the purchase is declined, the point-of-sale attendant simply depresses the "cancel" bar 24 with the result that all record of the proposed purchase is cleared from the central computer D. Alternatively, if the purchase is approved, the attendant actuates the "enter" bar 26 instructing the issuance of the ordered ticket or tickets. The approval step in the process is illustrated by the block 80 in FIG. 5.

Upon receiving an approval signal, the central control computer D formulates a data packet indicative of the indicia to be printed on the lottery ticket or tickets. The step is indicated by the block 82 in FIG. 5. Also, the pertinent data of the transaction is stored in the control computer D for future addressing by wager data as indicated by the block 84. The formulation of a data packet is represented by the block 86 and the transmission of the data packet to the terminal T1 is illustrated by the block 88. Return of the data packet to the terminal T1 (FIG. 1) actuates the printer in the terminal to complete a lottery ticket or tickets. The formulated tickets are then delivered from the terminal T1 through the passage 30 (FIG. 1) for the purchaser. Accordingly, the human action involved in the provision of lottery tickets is very limited. Also, the process occurs very rapidly and with normal effort.

In accordance with the system of the disclosed embodiment, operation avoids many aspects of security requirements involving data yet accommodates the rapid and efficient sale of lottery tickets. Of course, the system of the present invention may be embodied in a wide variety of different forms utilizing many different specific techniques and structures. While exemplary operations have been stated herein, and certain detailed structures have been disclosed, the appropriate scope hereof is deemed to be in accordance with the claims as set forth below.

What is claimed is:

1. A lottery system for use by a participant utilizing an order card, said system to issue lottery tickets at a facility encompassing a plurality of point-of-sale locations, said system comprising:

a plurality of terminals for use at said point-of-sale locations, said terminals including an order card reader means and a lottery ticket printer means; and a control means coupled to control said plurality of terminals, said control means including:

input means for receiving card data from a card reader means in an active terminal;

means to formulate lottery ticket identification data for association with card data received from said active terminal;

means for storing said card data and associated lottery ticket identification data; and means for actuating said active terminal to drive the terminal lottery ticket printer means to print a lottery ticket with said card data and said lottery ticket identification data, said card data consisting solely of wager data specifying wagers to be made by a participant; and a play center means for processing cards to record said card data, said play center means including means to interface said terminals with other components of said control means at a remote location.

2. A system according to claim 1 wherein said play center means includes means to interface other components through telephone facilities.

3. A lottery system for use by a participant utilizing an order card, said system to issue lottery tickets at a facility encompassing a plurality of point-of-sale locations, said system comprising:

a plurality of terminals for use at said point-of-sale locations, said terminals including an order card reader means and a lottery ticket printer means; and a control means coupled to control said plurality of terminals, said control means including:

input means for receiving card data from a card reader means in an active terminal;

means to formulate lottery ticket identification data for association with card data received from said active terminal;

means for storing said card data and associated lottery ticket identification data; and means for actuating said active terminal to drive the terminal lottery ticket printer means to print a lottery ticket with said card data and said lottery ticket identification data, said card data consisting solely of wager data specifying wagers to be made by a participant; and means for testing the format of said card data.

* * * * *